United States Patent [19]
Yoneda et al.

[11] Patent Number: 5,477,118
[45] Date of Patent: Dec. 19, 1995

[54] NUMERICAL CONTROLLER

[75] Inventors: Takao Yoneda, Nagoya; Fumio Yamamoto, Chiryu; Yasuji Sakakibara, Hekinan; Naoki Arimoto, Takahama; Yoji Yoshida, Kariya; Chisato Banno, Nagoya, all of Japan

[73] Assignee: Toyoda Koki Kabushiki Kaisha, Kariya, Japan

[21] Appl. No.: 658,581

[22] Filed: Feb. 21, 1991

[30] Foreign Application Priority Data

Feb. 21, 1990 [JP] Japan .................................. 2-41982
Mar. 23, 1990 [JP] Japan .................................. 2-74046
Mar. 27, 1990 [JP] Japan .................................. 2-79158

[51] Int. Cl.⁶ .......................................... G05B 19/18
[52] U.S. Cl. ................ 318/569; 318/568.16; 364/474.15; 364/474.17
[58] Field of Search ....................... 318/560–561, 318/567, 568.1–568.24, 564, 572; 364/474.01, 474.06, 474.12, 474.15

[56] References Cited

U.S. PATENT DOCUMENTS

| | | | |
|---|---|---|---|
| 4,195,250 | 3/1980 | Yamamota | 318/561 |
| 4,293,913 | 10/1981 | Nishimura et al. | 364/474.23 X |
| 4,630,214 | 12/1986 | Barney et al. | 364/474.06 |
| 4,791,575 | 12/1988 | Watts, Jr. et al. | 364/474.06 X |
| 4,815,000 | 3/1989 | Yoneda et al. | 318/571 X |
| 4,887,221 | 12/1989 | Davis et al. | 364/474.22 |
| 4,905,417 | 3/1990 | Oda et al. | 351/165 TP |
| 5,015,814 | 5/1991 | Morishita | 219/69.12 |

FOREIGN PATENT DOCUMENTS

| | | |
|---|---|---|
| 2620958 | 3/1989 | France . |
| 2754732 | 6/1978 | Germany . |
| 3831298 | 3/1989 | Germany . |
| 59-30666 | 2/1984 | Japan . |

*Primary Examiner*—David S. Martin
*Attorney, Agent, or Firm*—Oblon, Spivak, McClelland, Maier & Neustadt

[57] ABSTRACT

A numerical controller for a grinding machine, wherein one of plural reference sizing points is selected according to the contents of a numerical control program. Measured analog data indicating the diameter of a workpiece is received continuously to determine if the size of the machined workpiece coincides with the selected reference sizing point. Upon the coincidence of the size of the machined workpiece with the reference sizing point, a sizing signal is provided, and then machining control is changed in response to the sizing signal. An analog signal provided by a measuring device is sampled at a predetermined interval in a predetermined time. The analog signal is tested to see if the analog signal is in a predetermined range, which is decided based upon the temperature variation or vibrations of the grinding machine. And the result of the test is displayed to facilitate checking the output characteristics of the measuring device. The analog signal is compared with a predetermined reference value, and then the result of the comparison is displayed together with a predetermined reference value.

17 Claims, 15 Drawing Sheets

NUMERICAL CONTROLLER

BACKGROUND OF THE INVENTION

1. Field of the Invention

The present invention relates to a numerical controller capable of processing an analog signal provided by an analog device and more particularly, to a numerical controller having a built-in sizing means and capable of checking the diameter of a workpiece based upon the analog output signal of an external diameter measuring apparatus.

2. Description of the Prior Art

The conventional numerical controller does not have any sizing function. A separate sizing device is connected through a sequential controller to the numerical controller to enable the numerical controller to execute a sizing function. The sizing device memorizes data for plural reference sizing points, i.e., points at which the levels of sizing signals are changed, and gives sizing signals, i.e., on-off signals with binary signal levels, through the sequential controller to the numerical controller to change the operation of the numerical controller. Thus, the sizing function is made possible by additionally providing the numerical controller with the sizing device and the sequential controller.

Accordingly, the conventional controller has a disadvantage that the reference sizing points cannot be adjusted or changed using the control panel of the numerical controller. Namely, the control panel of the sizing device must be operated to adjust the reference sizing points. Further, since the sizing signals applied through the sequential controller to the numerical controller by the sizing device are not analog signals but on-off signals, the numerical controller is unable to carry out a real-time control operation according to an instantaneous diameter value measured by the sizing device.

On the other hand, the measuring head and the amplifier of the sizing device are usually checked before shipment for checking the dependence characteristics of the measuring head and the amplifier of the sizing device on external disturbances, such as temperature variation or mechanical vibrations. This check operation is carried out by connecting a special measuring instrument to the measuring head and the amplifier of the sizing device.

Thus, separate measuring instruments must be connected to the respective functional component units of the sizing device in checking and verifying the characteristics of the sizing device separate from the numerical controller, requiring troublesome work for checking the characteristics. The output of the sizing device is measured independently of the operating condition of the numerically controlled machine tool. Accordingly, it is impossible to evaluate the output characteristics of the sizing device combined with the numerical controller under the condition that the machine tool is being operated under the control of the numerical controller when heat and mechanical vibrations are applied to the sizing device.

On the other hand, there is not any numerical controller capable of changing and selecting a machining process according to the level of an analog signal given thereto by a sizing device, such as a measuring device for measuring the diameter of a workpiece. The sizing device is connected through a sequential controller to the numerical controller. The sizing device converts the analog signal into on-off signals with binary signal levels by comparing the level of the analog signal with reference signal levels and outputs the on-off signals to the numerical controller through the sequential controller. The numerical controller and the sizing device separate from the numerical controller are provided with separate control panels, respectively.

Accordingly, the adjustment of the sizing device, the setting of command values designating the reference signal levels and the change of the number of set reference points (reference levels) can be achieved only by operating the control panel of the sizing device. When a plurality of analog devices are employed other than the sizing device, data must be read on the respective control panels of the separately installed individual analog devices, which further deteriorates working facility.

SUMMARY OF THE INVENTION

The present invention has been made to solve the foregoing problems and it is therefore a first object of the present invention to provide a numerical controller capable of directly receiving measured analog signals.

A second object of the present invention is to provide a numerical controller capable of controlling machining operation on the basis of an analog measuring signal the level of which indicates the diameter of a workpiece measured continuously during machining.

A third object of the present invention is to provide a numerical controller capable of directly and easily changing reference sizing points.

A fourth object of the present invention is to provide a numerical controller capable of directly receiving analog signals from a measuring device and of readily checking and verifying the dependence of the output characteristics of the measuring device on temperature and mechanical vibration during a practical machining operation.

A fifth object of the present invention is to provide a numerical controller capable of directly receiving analog signals provided by analog devices and of displaying all the output data of a plurality of analog devices on a single display, such as the CRT thereof.

In a numerical controller having a first aspect of the present invention, data input means receives measured analog data obtained by measuring the dimensions of a workpiece and converts the measured analog data into corresponding measured digital data, a sizing signal generating means compares the measured digital data provided by the data input means with the value of a reference sizing point and provides a sizing signal when the measured digital data coincides with the value of the reference sizing point, and a control means changes the control of the numerical controller in response to the sizing signal provided by the sizing signal generating means.

Thus, a numerical controller having the first aspect of the present invention is capable of directly receiving measured data from a measuring device and of controlling a machining mode on the basis of the measured data.

In a numerical controller having a second aspect of the present invention, measured data given by data input means is periodically provided at a predetermined sampling interval during a sampling operation. Data testing means tests the measured data to determine if the measured data is included in a range between upper and lower limits, the range being calculated by taking into consideration a tolerance for variation due to temperature variation or mechanical vibrations, the tolerance being stored in tolerance storage means. Data output means displays the tested measured data.

Thus, the numerical controller is capable of directly receiving measured analog data from the measuring device and, after connecting the measuring device to the numerical controller, the dependence of the output characteristics of the measuring device on temperature and vibration can be checked and verified. Therefore, on the condition that the measuring device is being connected with the mechanical controller, the output characteristics of the measuring device can readily be evaluated thereby facilitating periodic inspection of the measuring system.

In a numerical controller having a third aspect of the present invention, a data input means receives an analog signal provided by an analog device and converts the analog signal into digital data, and a data evaluating means compares the input data with predetermined command data indicating a reference level. Data display means displays the relation between the input data and the reference level together with the result of the comparison.

Thus, the numerical controller having the third aspect of the present invention can provide a display, such as a CRT, connected thereto, which can display the total output data output from the analog device on one screen and make the display readily understandable and accessible.

DESCRIPTION OF THE PREFERRED EMBODIMENTS

First Embodiment

1. General Structure of the NC Grinding Machine

Figure 1:
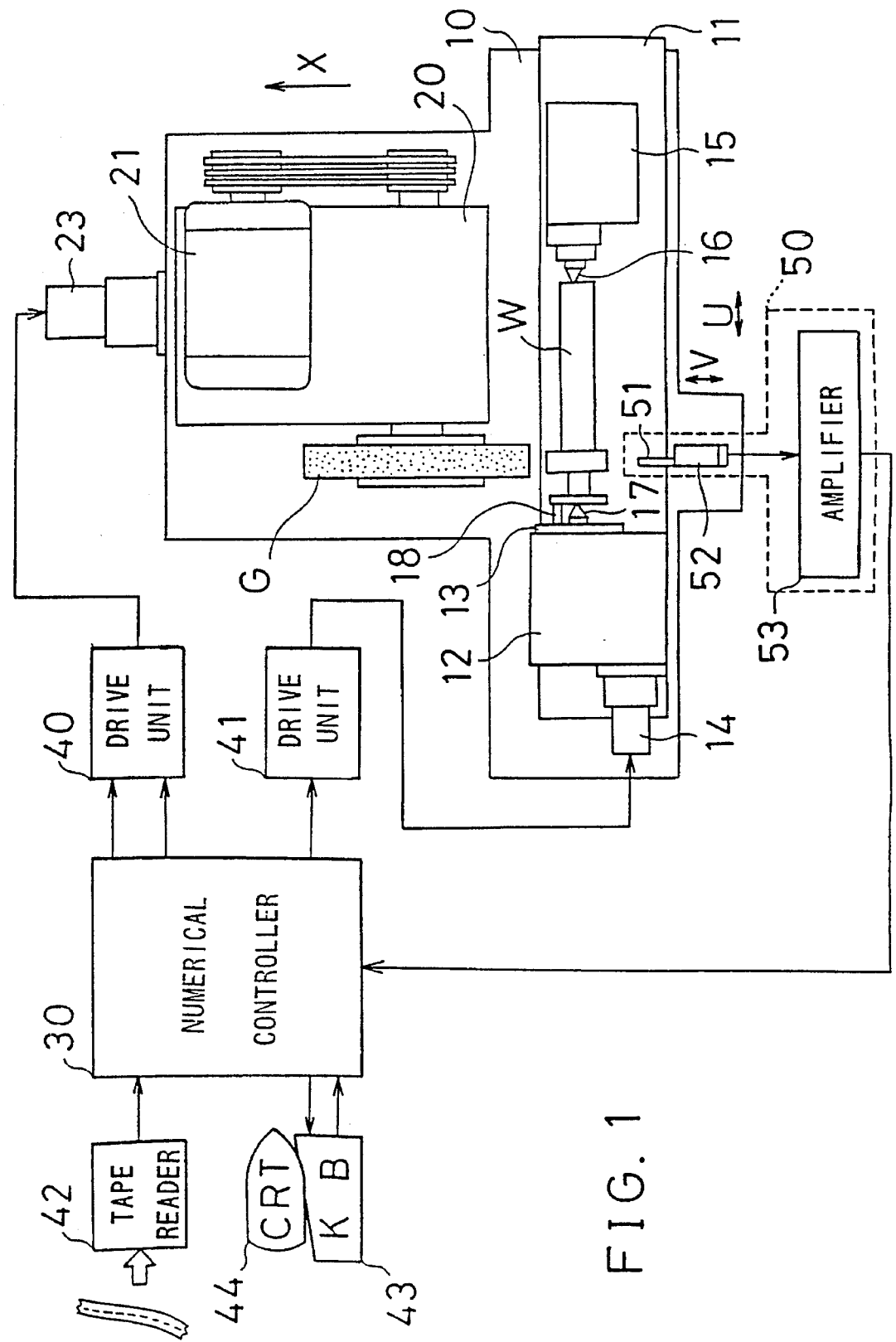
FIG. 1 is a block diagram of a grinding machine incorporating a numerical controller having a sizing function in a first embodiment according to the present invention.

Referring to FIG. 1, a grinding machine has a bed 10, and a table 11 mounted for sliding movement on the bed 10. A headstock 12 supporting a spindle 13 is mounted on the table 11. A servomotor 14 rotates the spindle 13. A tailstock 15 is mounted on the right-hand end of the table 11 to hold a workpiece W between the center 16 of the tailstock 15 and the center 17 of the spindle 13. The workpiece W is located by a locating pin 18 projecting from the spindle 13 so that the workpiece W is in a predetermined relationship with the spindle 13 in rotational direction.

A wheel slide 20 is disposed behind the bed 10 so as to be moved toward and away from the workpiece W. A grinding wheel G supported on the wheel slide 20 is rotated by a motor 21. A servomotor 23 operatively connected to the wheel slide 20 by a feed screw, not shown, is controlled for the normal rotation and the reverse rotation to move the wheel slide 20 toward and away from the workpiece W.

A measuring unit 50 for measuring the diameter of the workpiece W is disposed in front of the bed 10.

Figure 2:
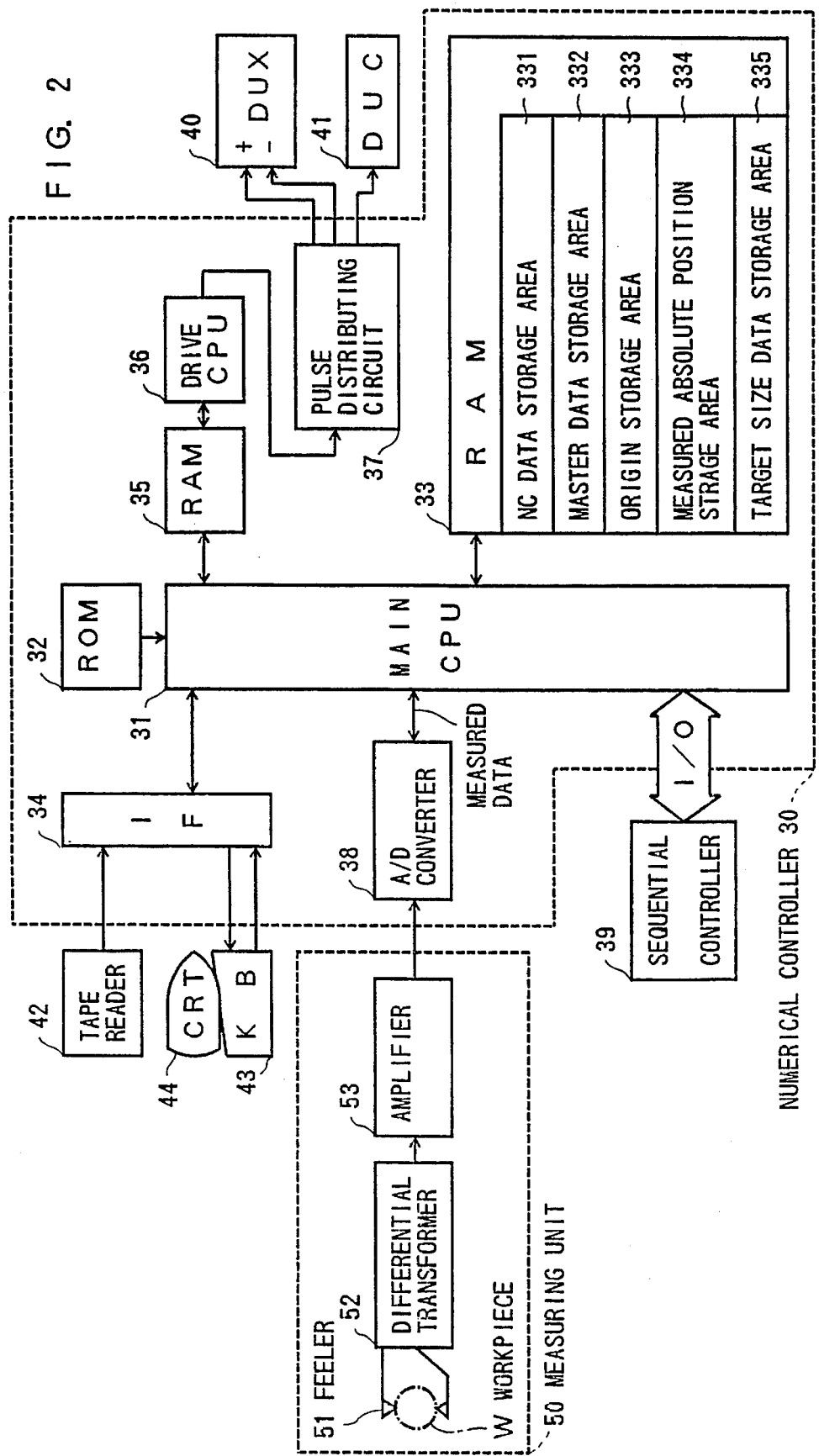
FIG. 2 is a block diagram showing the electrical structure of the numerical controller of FIG. 1.

The measuring unit 50 comprises, as principal components, a pair of feelers 51, a differential transformer 52 and an amplifier 53, as shown in FIG. 2. In measuring the diameter of the workpiece W, the distance between the pair of feelers 51 is adjusted with the variation of the diameter of the workpiece W. The amplifier 53 of the measuring unit 50 amplifies an analog signal measured with the pair of feelers 51 and gives the measured analog signal to a numerical controller 30. The output of the amplifier 53 represents the variation of the distance between the pair of feelers 51 from a predetermined initial distance.

Drive units 40 and 41 are controlled by command pulses provided by the numerical controller 30 to drive the servomotors 23 and 14, respectively.

The numerical controller 30 controls the servomotors 14 and 23 synchronously to control the operation for grinding the workpiece W. A tape reader 42 for entering machining cycle data, a keyboard 43 on a control panel for entering control data and the like, and a CRT 44 for displaying information are connected to the numerical controller 30.

2. Configuration of the Numerical Controller

FIG. 2 is a block diagram showing the electrical structure of the numerical controller 30.

The numerical controller 30 comprises, as principal components, a main CPU 31 for controlling the grinding machine, a ROM 32 storing control programs, a RAM 33 for storing data, an input-output interface and an A/D converter 38, i.e., data input means.

The A/D converter 38 is connected to the main CPU 31 to convert measured analog signals provided by the measuring unit 50 into proportional digital data and to give the digital data to the main CPU 31. The main CPU 31 outputs a sizing signal with a binary signal level through an I/O port to a sequential controller 39.

The RAM 33 has an NC data storage area 331, a master data storage area 332, an origin storage area 333, a measured absolute position storage area 334 and a target size data storage area 335. The NC data storage area 331 stores NC data. The master data storage area 332 stores master data $M_S$, namely, absolute dimensions of a masterpiece $W_M$. The origin storage area 333 stores an origin $M_O$, i.e., the absolute position of the origin in a measuring range of the measuring unit 50. The output of the measuring unit 50 indicates deviation from the origin $M_O$. Accordingly the origin $M_O$ is obtained by subtracting the measured master data $M_M$, which is outputted from the measuring unit 50 when the masterpiece $W_M$ is measured by the measuring unit 50, from the master data $M_S$. When the output of the measuring unit 50 is zero, the measured diameter of the workpiece is equal to the reference diameter indicated by the origin $M_O$.

The measured absolute position storage area 334 stores the measured absolute position $A_W$ of the workpiece W obtained by adding the origin $M_O$ to the measured data $M_W$ of the workpiece W, i.e., the deviation from the origin $M_O$. The target size data storage area 335 stores target sizes $S_1$, ... and $S_n$ as reference values corresponding to reference sizing points. Upon the coincidence of the measured absolute data $A_W$, i.e., the measured diameter of the workpiece W, with the target sizes $S_1$ ... and $S_n$ (the reference sizing points), respective sizing signals are generated.

The numerical controller 30 has a drive system comprising a drive CPU 36, a RAM 35 and a pulse distribution circuit 37, for driving the servomotors 14 and 23, through the drive units 40, 41.

The RAM 35 receives positioning data for positioning the grinding wheel G from the CPU 31. The drive CPU 36 performs operations for the slowup and slowdown of the feed of the grinding wheel G and for deciding interpolation points on a path reaching a target point. The drive CPU 36 provides the position data of the interpolated points periodically. The pulse distribution circuit 37 outputs movement command pulses to the drive units 40, 41.

3. Operations of the Numerical Controller

Figure 3:
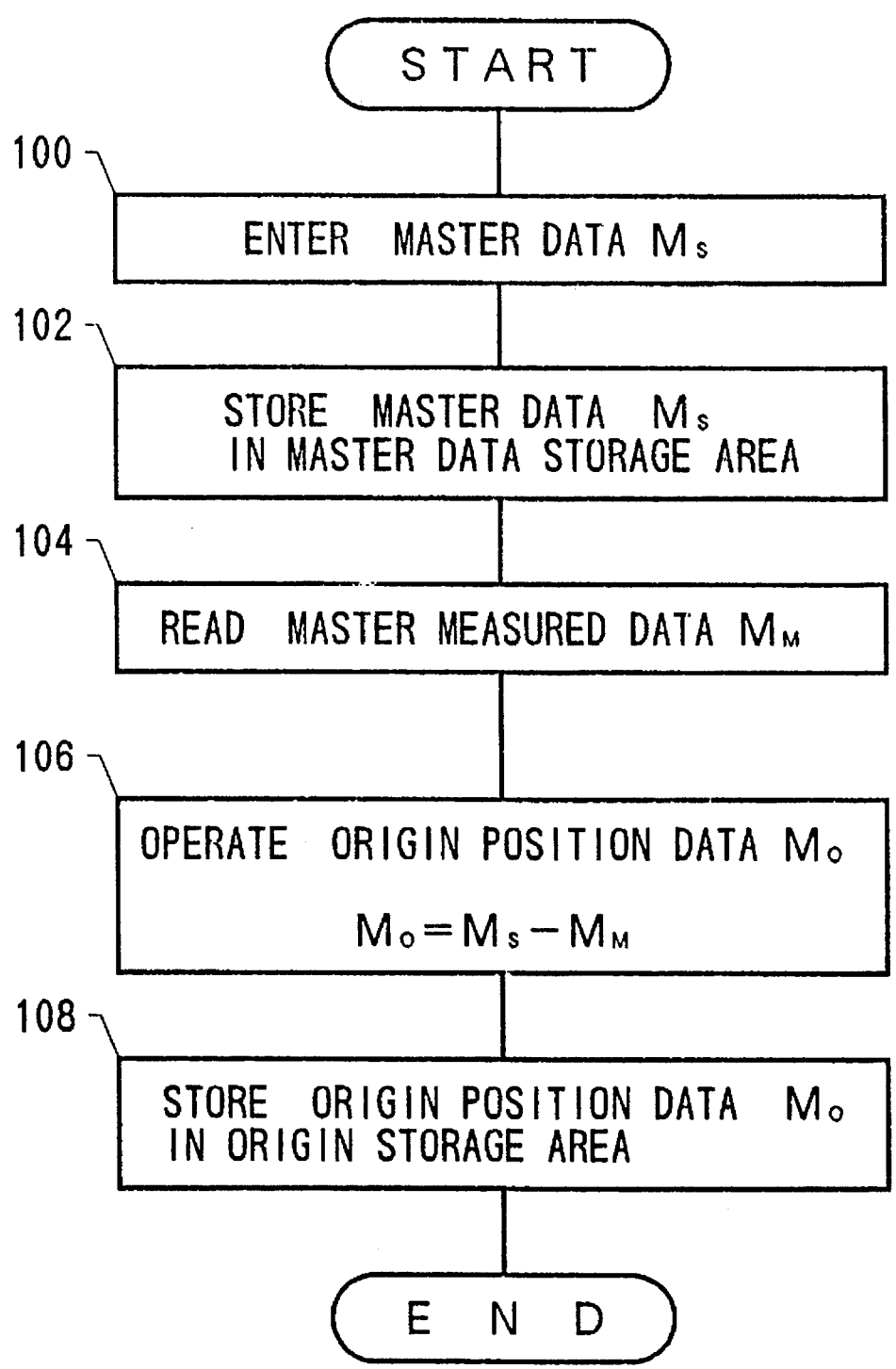
FIGS. 3, 4 and are flow charts of procedures to be executed by a main CPU included in the numerical controller of FIG. 2.
Figure 4:
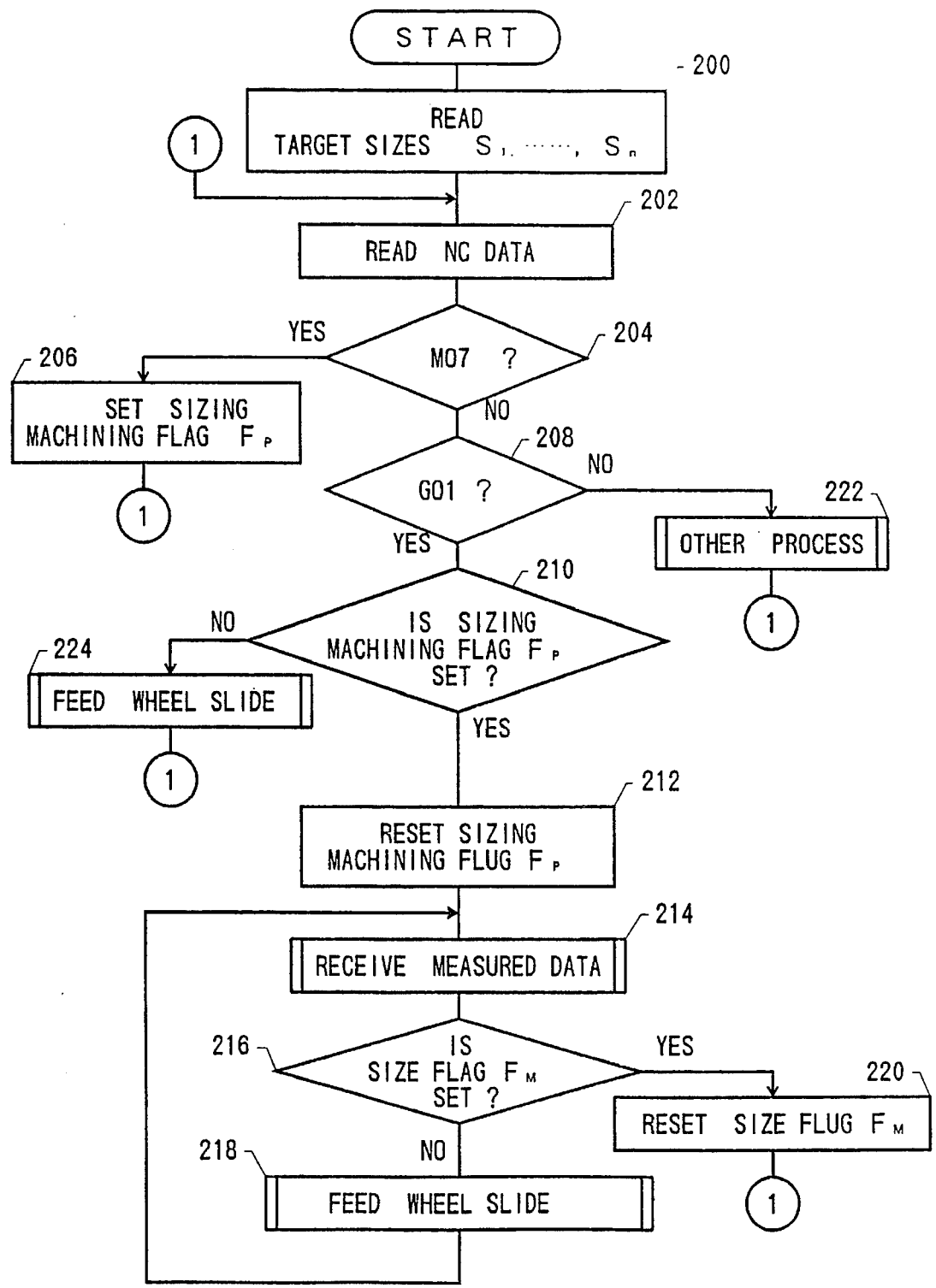
Figure 5:
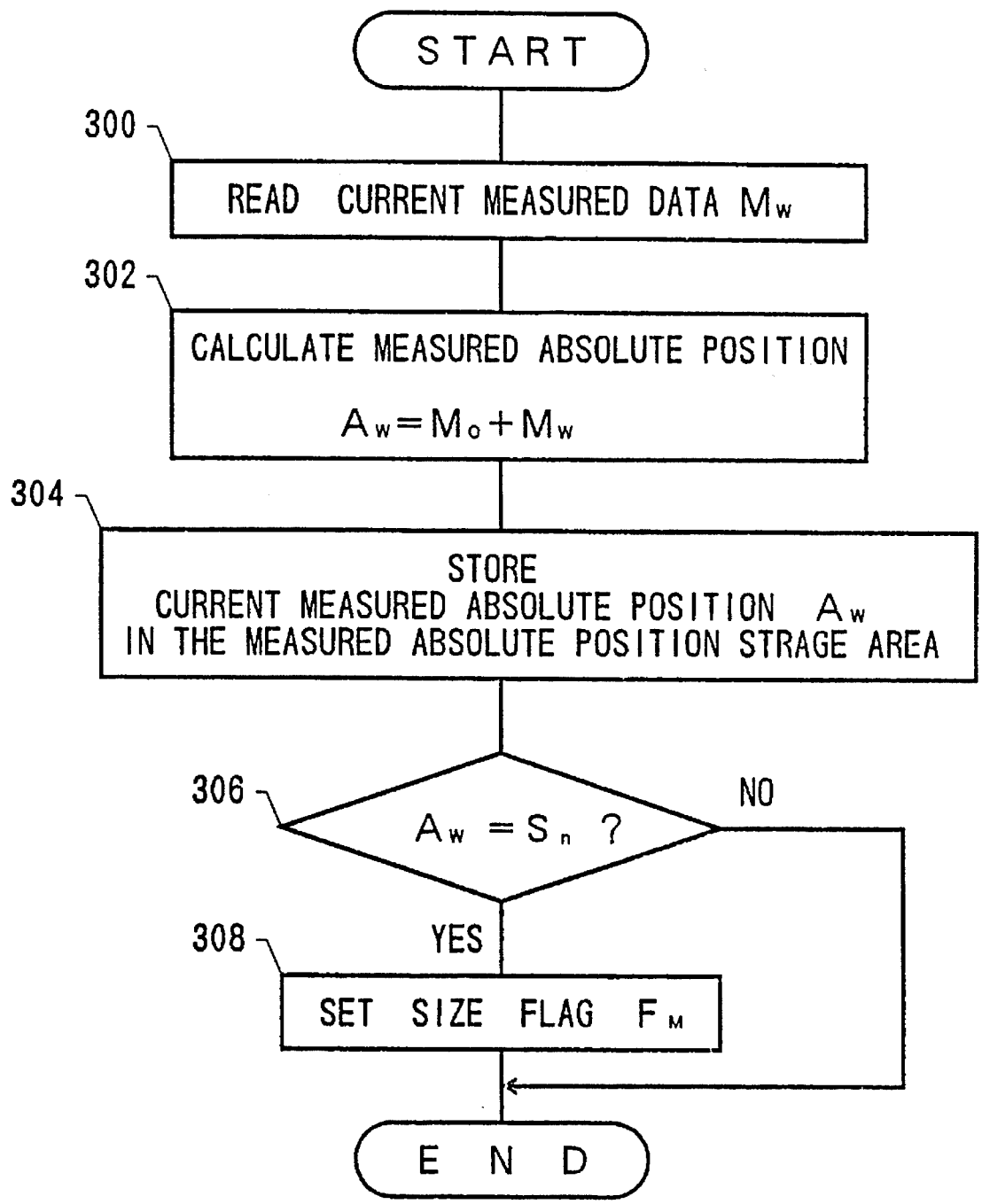
Figure 6:
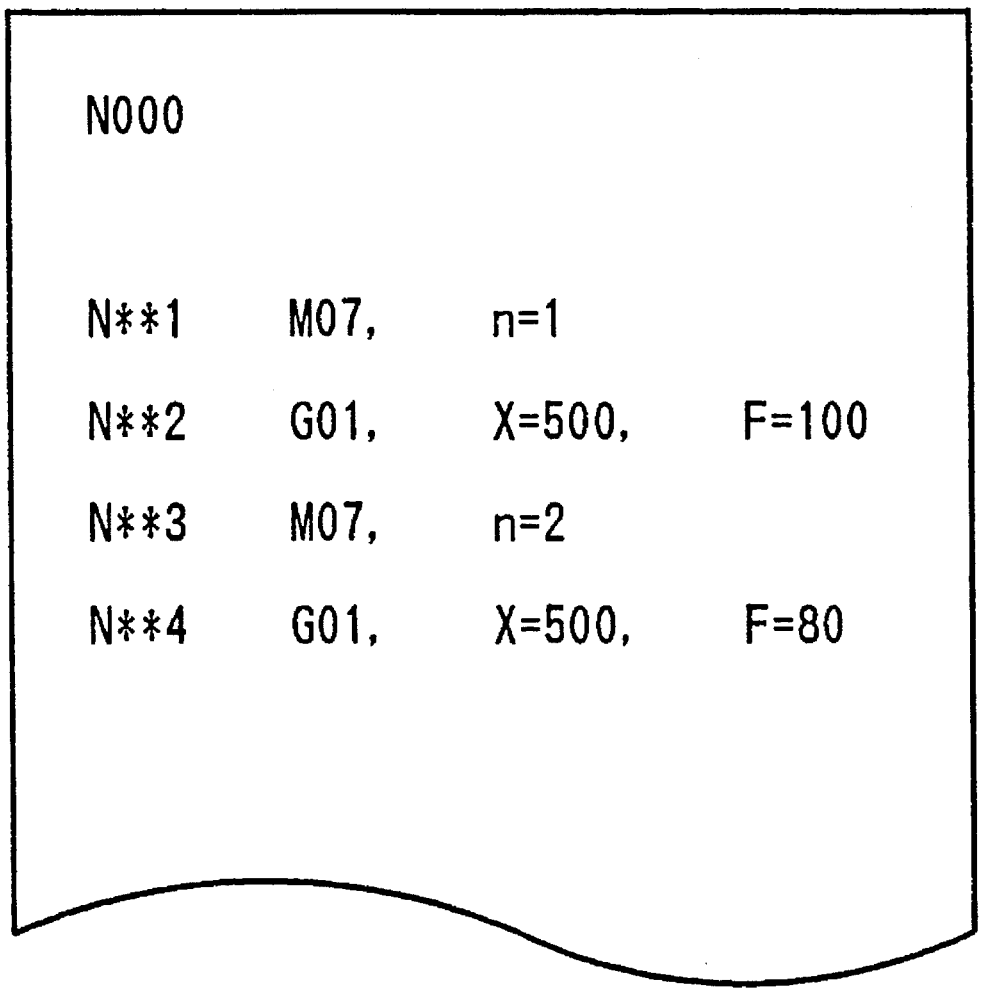
FIG. 6 is an illustration of an NC program to be executed by the numerical controller of FIG. 2.

FIGS. 3, 4 and 5 are flow charts of procedures to be executed by the main CPU 31 of the numerical controller 30. The flow charts shown in FIGS. 3, 4 and 5 will be described with reference to FIG. 6 showing an NC program stored in the NC data storage area 331 of the RAM 33 of the numerical controller 30.

First, a masterpiece measurement program shown in FIG. 3 is executed. Prior to the execution of the masterpiece measurement program, the masterpiece $W_M$ is set between the pair of centers 15, 16, and the pair of feelers 51 of the measuring unit 50 is advanced so that the feelers 51 of the measuring unit 50 are engaged with the masterpiece.

In step 100, the master data $M_S$, i.e., the absolute dimensions of the masterpiece $W_M$ are entered by operating the keyboard 43 and, in step 102, the master data $M_S$ is stored in the master data storage area 332 of the RAM 333.

Then, in step 104, the numerical controller 30 reads the measured master data $M_M$ of the masterpiece $W_M$ from the measuring unit 50.

In step 106, the origin $M_O$ in the measuring range of the measuring unit 50, i.e., the initial clearance or distance between the pair of feelers 51 is calculated by using formula:

$$M_O = M_S - M_M$$

In step 108, the origin $M_O$ calculated in step 106 is stored in the origin storage area 333, and then the program is ended.

Subsequently, a machining program shown in FIG. 4 is executed. In step 200, the target sizes $S_1$, ... and $S_n$ as the reference sizing points representing the reference diameters of the workpiece and previously stored in the target size data storage area 335 are read.

In step 202, one block of the NC program stored in the NC data storage area 331 of the RAM 33 is read.

In step 204, it is judged whether or not the block of the NC program read in step 202 has a command M07, i.e., a machining command with sizing ( a sizing machining command ). If a block N1 having the command M07 (FIG. 6) is read in step 202, the response in step 204 is affirmative, and then step 206 is executed. step 206, a sizing machining flag $F_P$ is set, and then the program returns to step 202 to read the next block N2.

Since the block N2 does not have the command M07, the response in step 204 is negative, and the program proceeds to step 208. In step 208, it is judged whether or not the block N2 has a feed command G01. Since the block N2 has the feed command G01, the response is affirmative, and then it is Judged in step 210 whether or not the sizing machining flag $F_P$ is set. Since the sizing machining flag $F_P$ is set, the sizing machining flag $F_P$ is reset in step 212, and then the program proceeds to step 214**.

In step 214, a measured data input program shown in FIG. 5 is executed.

Referring to FIG. 5, the current measured data $M_W$ of the workpiece W is read from the measuring unit 50 in step 300.

In step 302, the measured absolute position $A_W$ of the workpiece W is calculated by using a formula:

$$A_W = M_O + M_W$$

where $M_W$ is the measured data of the workpiece W, and $M_O$ is the origin in a measuring range of the measuring unit 50 previously stored in the origin storage area 333 of the RAM 33.

Then, in step 304, the measured absolute position $A_W$ calculated in step 302 is stored in the measured absolute position storage area 334 of the RAM 33.

In step 306, it is judged whether or not the measured absolute position $A_W$ stored in the measured absolute position storage area 334 of the RAM 33 is equal to the target size $S_1$ (the reference sizing point) previously stored in the target size data storage area 335 of the RAM 33, because n=1 in the block N2. If the workpiece W has not been machined to the first target size $S_1$ (the first reference sizing point), the response in step 306** is negative, and then the program is ended. When $A_W = S_1$, the size flag $F_M$ is set, i.e. a sizing signal is generated, and then the program is ended.

Referring again to FIG. 4, it is judged in step 16 whether or not the size flag $F_M$ is set. If $A_W$ is not equal to $S_1$ and hence the size flag $F_M$ is reset, a wheel slide feed program is executed in step 218. The wheel slide 20 is fed at a feed speed F=100 specified in the block N2 of the NC program of FIG. 6. Thereafter, steps 214 to 218 are repeated. When the response in step 306 is affirmative, namely, when $A_W = S_1$, the size flag $F_M$ is set, i.e. the sizing signal is generated, so that the response in step 216 is affirmative. Then, in step 220, the size flag $F_M$ is reset to interrupt the machining operation according to the command G01 of the block N2 of the NC program when the workpiece W is machined to the first target size $S_1$.

Then, the program returns to step 202 and a block N3 of the NC program of FIG. 6** is read, and the foregoing procedure is repeated.

When the block of the NC program read in step 202 does not have the command G01, the program proceeds to step 222 to execute a procedure specified by another command code, and then the program returns to step 202 to repeat the foregoing procedure. When it is determined in step 210 that the sizing machining flag $F_P$ is not set, the wheel slide feed program is executed in a normal mode in step 224, and then the program returns to step 202 to repeat the foregoing procedure.

When the workpiece W is machined to a size corresponding to X=500 specified in the block N**2 of the NC program during the execution of the wheel slide feed program in step 218 before the size flag $F_M$ is set, the feed of the wheel slide 20 is stopped to stop the machining operation and the program is ended.

Thus, the numerical controller 30 having a sizing function is provided with the A/D converter 38 connected to the measuring unit 50 and is capable of receiving the measured data of the workpiece W provided by the measuring unit 50 in a real-time mode. Therefore, the numerical controller 30 is capable of performing minute time-continuous control operation on the basis of measured values.

The numerical controller 30 is capable of rapid changing of a machining operation mode because the numerical controller 30 directly generates the sizing signal by setting the size flag $F_M$ in the main CPU 31 without requiring any sequential controller.

Furthermore, since it is possible to set and change the reference sizing points (the target sizes) in the RAM 33 of the numerical controller 30 through the operation of the key board 43 of the numerical controller 30 and through the recognition of date displayed on the CRT 44 of the numerical controller the accessibility of the numerically controlled system is improved.

Second Embodiment

1. General Structure of the NC Grinding Machine

The NC grinding machine incorporating a numerical controller in a second embodiment according to the present invention is similar in structure to the NC grinding machine shown in FIG. 1.

2. Configuration of the Numerical Controller

The numerical controller 30 in a second embodiment according to the present invention is identical in configuration with the numerical controller in the first embodiment shown in FIG. 2, except that a RAN 88 employed in the second embodiment is different from that employed in the first embodiment.

Figure 7:
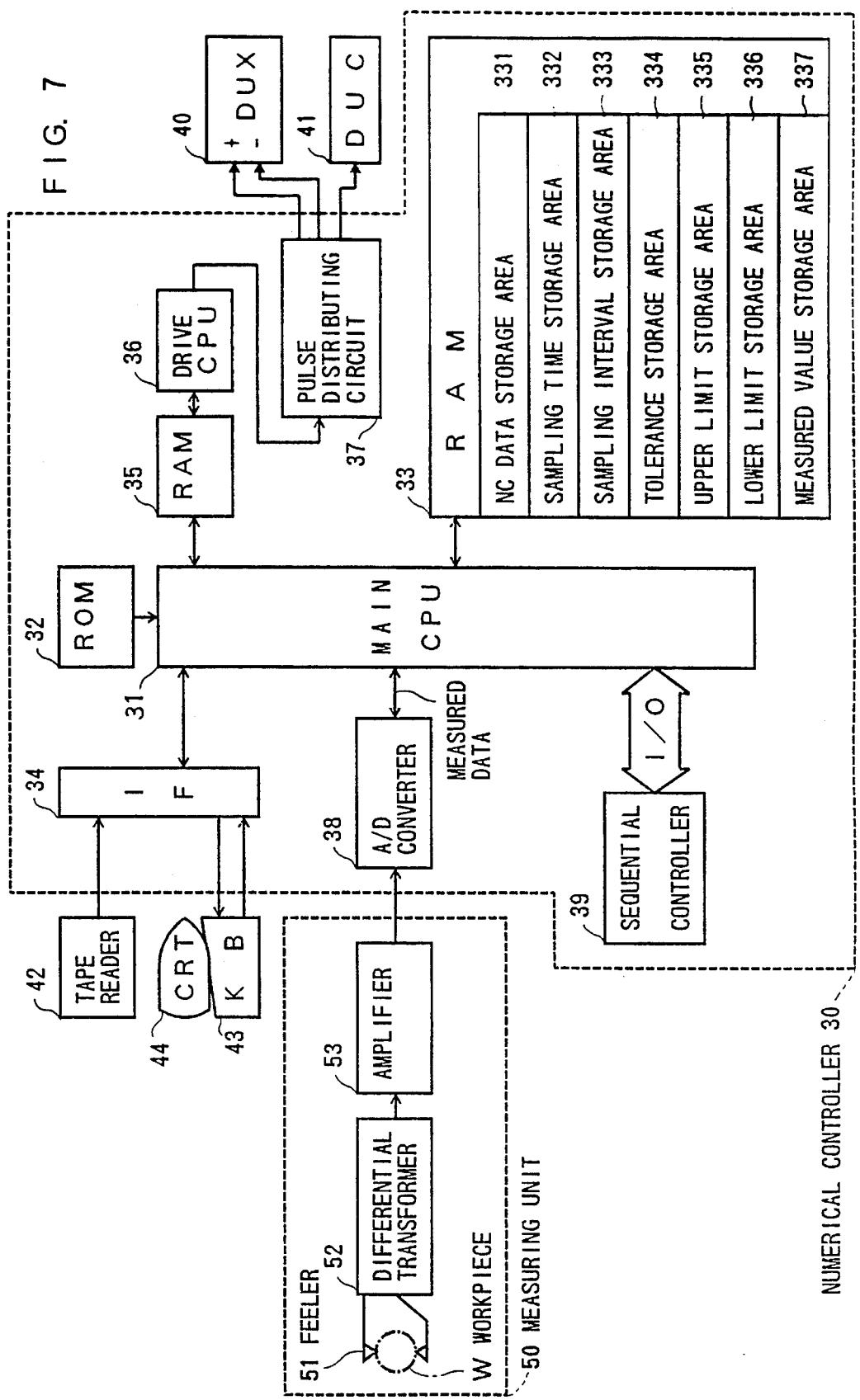
FIG. 7 is a block diagram showing the electrical structure of a numerical controller in a second embodiment according to the present invention.

Referring to FIG. 7, the RAM 83 has an NC data storage area 331, a sampling time storage area 332, a sampling interval storage area 333, a tolerance storage area 334, an upper limit storage area 335, a lower limit storage area 336 and a measured value storage area 337. The NC data storage area 331 stores NC data. The sampling time storage area 332 stores a sampling time $T_S$ for which a timer $T_1$ is set. The sampling interval storage area 333 stores a sampling interval $T_I$ for which a timer $T_2$ is set. The tolerance storage area 334 stores a tolerance $V_T$. The upper limit storage area 335 stores an upper limit $V_{MAX}$ obtained by adding the tolerance $V_T$ to a basic value $V_B$ obtained by initially pre-measuring a diameter of a masterpiece $W_B$. The lower limit storage area 336 stores a lower limit $V_{MIN}$ obtained by subtracting the tolerance $V_T$ from the basic value $V_B$. The measured value storage area 337 stores a measured value $V_M$ of the masterpiece $W_B$ measured in testing or calibration of the measuring unit 50 at the sampling interval $T_I$ in the sampling time $T_S$. And also information indicating the result of evaluation of the measured value $V_M$ represented by OK (acceptable) or NG (rejection) is stored in the storage area 337. The storage areas of the RAM 33 have the functions of sampling time storage means.

3. Operations of the Numerical Controller

Figure 8:
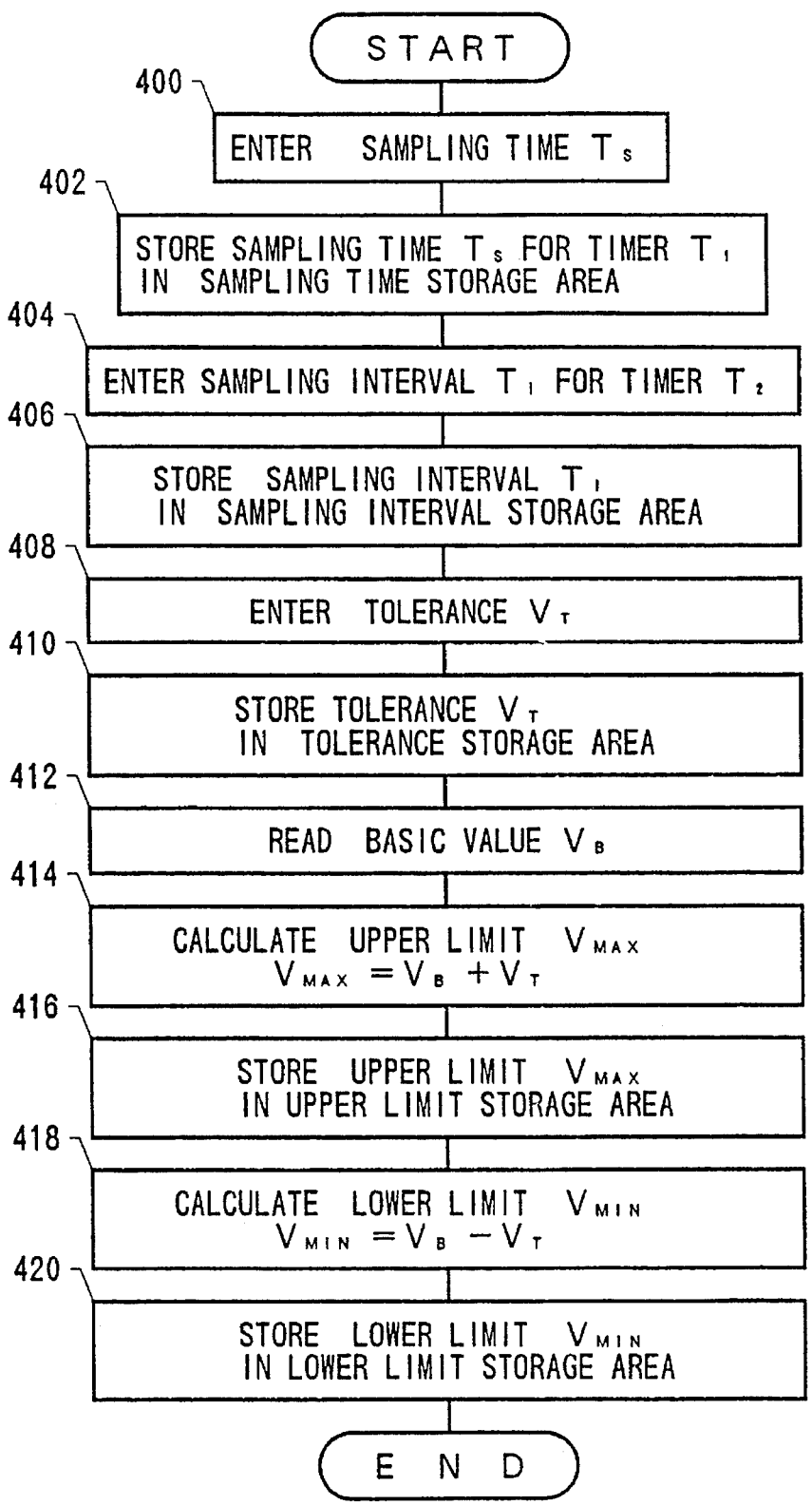
FIGS. 8 and 9 are flow charts of procedures to be executed by a CPU included in the numerical controller of FIG. 7.
Figure 9:
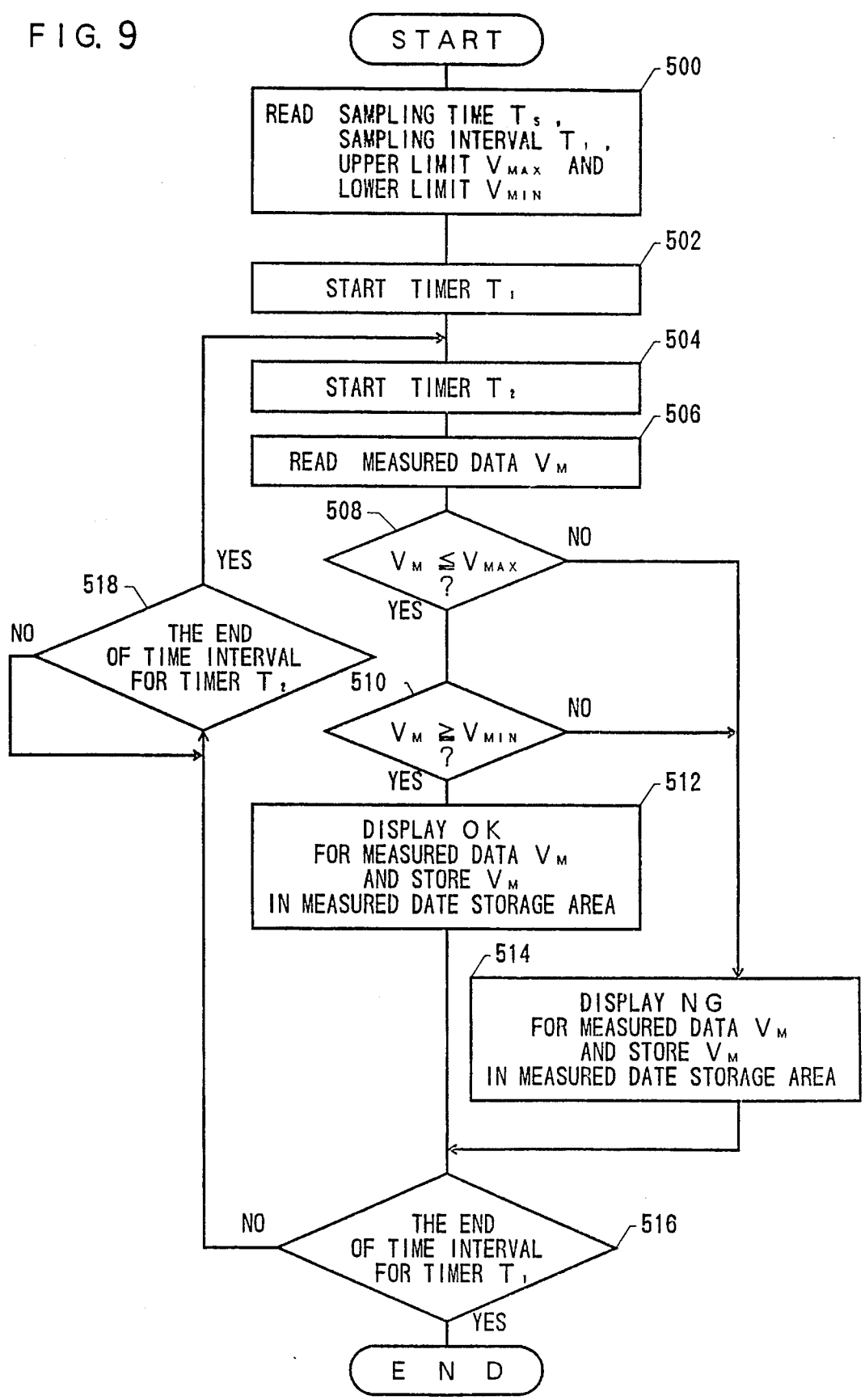
Figure 10:
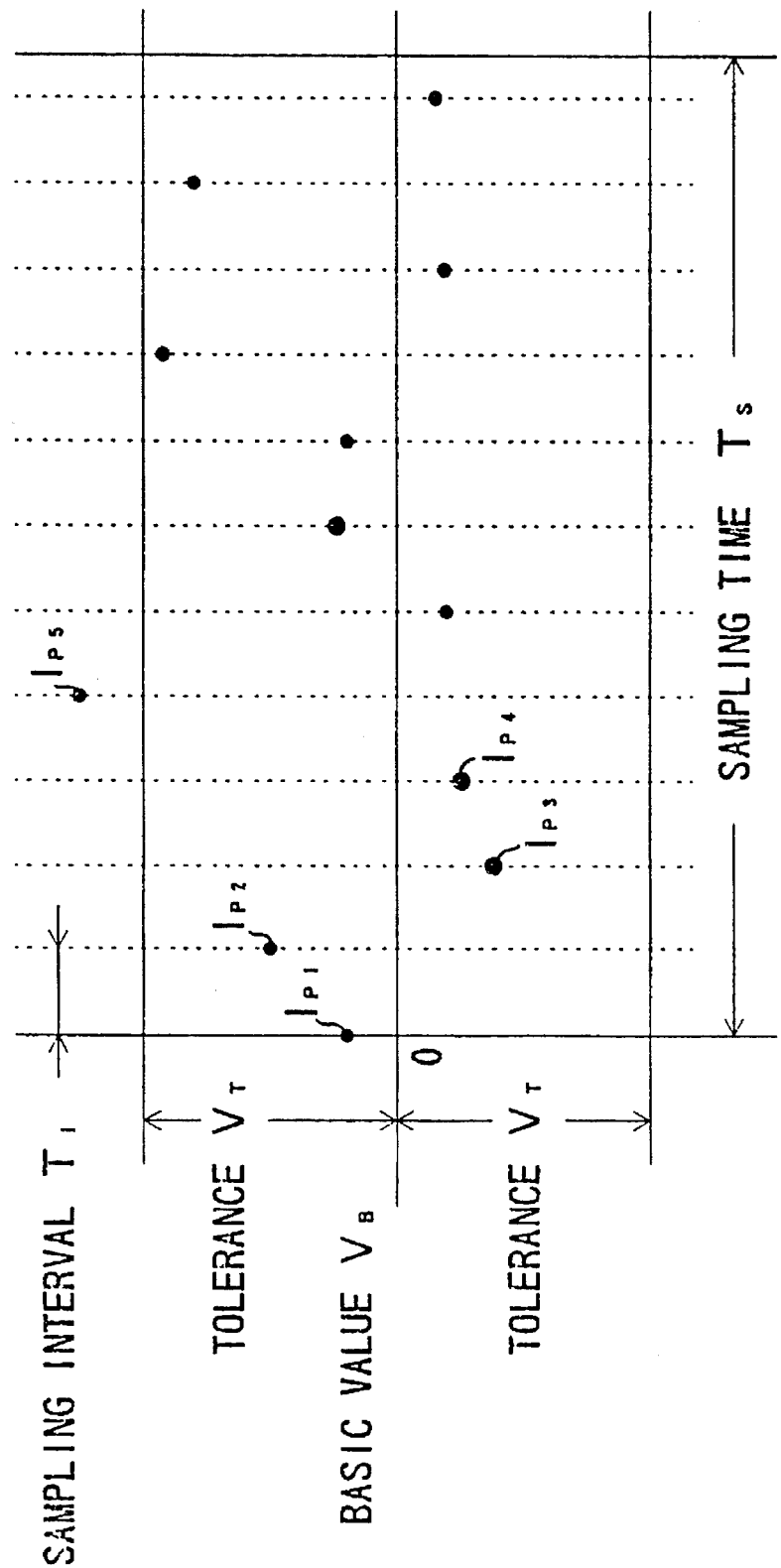
FIG. 10 is a diagram showing an example of the result of sampling displayed on a CRT included in the numerical controller of FIG. 1.

Operation of the numerical controller 30 will be described with reference to FIGS. 8 and 9 showing a procedure to be executed by the main CPU 31 of the numerical controller 30, and FIG. 10 showing data obtained by sampling.

An initialization program shown in FIG. 8 is executed for checking and verifying the temperature, vibration and starting characteristics.

Before starting the initialization program, a masterpiece $W_B$ is set between the pair of centers 15, 16, and the pair of feelers 51 of the measuring unit 50 is advanced so that the feelers 51 of the measuring unit are engaged with the masterpiece $W_B$.

In step 400, a sampling time $T_S$, i.e., a desired period of sampling, for which the timer $T_1$ is set is entered by operating the keyboard 43. Then, in step 402, the sampling time $T_S$ is stored in the sampling time storage area 332 of the RAM 33.

In step 404, a sampling interval $T_I$ for which the timer $T_2$ is set is entered by operating the keyboard 43, and then the sampling interval $T_I$ is stored in the sampling interval storage area 333 of the RAM 33 in step 406.

Then, in step 408, a tolerance $V_T$ is entered by operating the keyboard 43, and then the tolerance $V_T$ is stored in the tolerance storage area 334 in step 410.

Then, in step 412, a basic value $V_B$, i.e., a deviation from an origin of the sizing unit 50, previously obtained by pre-measuring the diameter of the masterpiece $W_B$ is entered from the keyboard 43.

In step 414, an upper limit $V_{MAX}$ for the masterpiece $W_B$ is calculated by using a formula:

$$V_{MAX}=V_B+V_T$$

Then, in step 416, the upper limit $V_{MAX}$ obtained in step 414 is stored in the upper limit storage area 335.

In step 418, a lower limit $V_{MIN}$ for the masterpiece $W_B$ is calculated by using a formula:

$$V_{MIN}=V_B-V_T$$

In step 420, the lower limit $V_{MIN}$ obtained in step 418 is stored in the lower limit storage area 336, and then the program is ended.

Subsequently, a sampling program shown in FIG. 9 is executed. In step 500, the sampling time $T_S$ for which the timer $T_I$ is set, the sampling interval $T_1$ for which the timer $T_2$ is set, the upper limit $V_{MAX}$ and the lower limit $V_{MIN}$ are read from the sampling time storage area 332, sampling interval storage area 333, upper limit storage area 335 and lower limit storage area 336, respectively, of the RAM 33.

In step 502, the timer $T_1$ is started, and then the timer $T_2$ is started in step 504.

In step 506, the diameter of the masterpiece $W_B$ is measured by contacting the feelers 51 of the measuring unit 50 to the surface of the masterpiece $W_B$, the measured analog data is converted into proportional measured digital data by the A/D converter 38 to obtain a measured data $V_M$, and then the measured data $V_M$ is stored. In step 508, it is judged whether or not the measured data $V_M$ is not greater than the upper limit $V_{MAX}$. If the response in step 508 is affirmative, it is judged in step 510 whether or not the measured data $V_M$ is not less than the lower limit $V_{MIN}$. If the response in step 510 is affirmative, the measured data $V_M$ is regarded as OK (acceptable), and the measured data $V_M$ is displayed as indicated by the plotted data points $I_{P1}$, $I_{P2}$, $I_{P3}$, $I_{P4}$, ... in FIG. 10 together with the basic value $V_B$ and the tolerance $V_T$ on the screen of the CRT 44 of the numerical controller 30 in step 512. The acceptable measured data $V_M$ is stored in the measured data storage area 337 of the RAM 33.

If the response in step 508 or in step 510 is negative, namely, if the measured data $V_M$ read in step 506 is greater than the upper limit $V_{MAX}$ or less than the lower limit $V_{MIN}$, the program proceeds to step 514, in which the measured data $V_M$ is regarded as NG (rejection) and is displayed on the screen of the CRT 44 as indicated in FIG. 10 by a plot of data point $I_{P5}$ and the rejected measured data is stored in the measured value storage area 337.

Then, in step 516, it is judged whether or not the time $T_S$ for which the timer $T_1$ is set has elapsed. If the response in step 516 is negative, namely, if the sampling time $T_S$ for sampling with the diameter of the masterpiece $W_B$ has not elapsed, it is judged in step 518 whether or not the sampling interval $T_I$ for which the timer $T_2$ is set has elapsed. After the sampling interval $T_I$ has elapsed, the program returns to step 504, and then the foregoing procedure is repeated for the next measured data $V_M$.

When the response in step 516 is affirmative, the program is ended.

Data evaluating means is achieved in steps 508 and 510, and data output means is achieved in steps 512 and 514.

As is apparent from the foregoing description, the numerical controller in the second embodiment having a sizing function enables the checking and verification of the temperature, vibration and starting characteristics and the accuracy of repetition measurement of the measuring unit 50 through the operation of the keyboard 43 thereof without requiring external measuring instruments, which facilitates the sizing operation remarkably. The temperature, vibration and starting characteristics of the entire system including the mechanical system can readily be evaluated after connecting the measuring unit 50 to the numerical controller 30, which facilitates on-site periodic inspection.

Third Embodiment

1. General Structure of the NC Grinding Machine

The NC grinding machine incorporating a numerical controller in a third embodiment according to the present invention is identical in structure with the NC grinding machine shown in FIG. 1.

2. Configuration of the Numerical Controller

Figure 11:
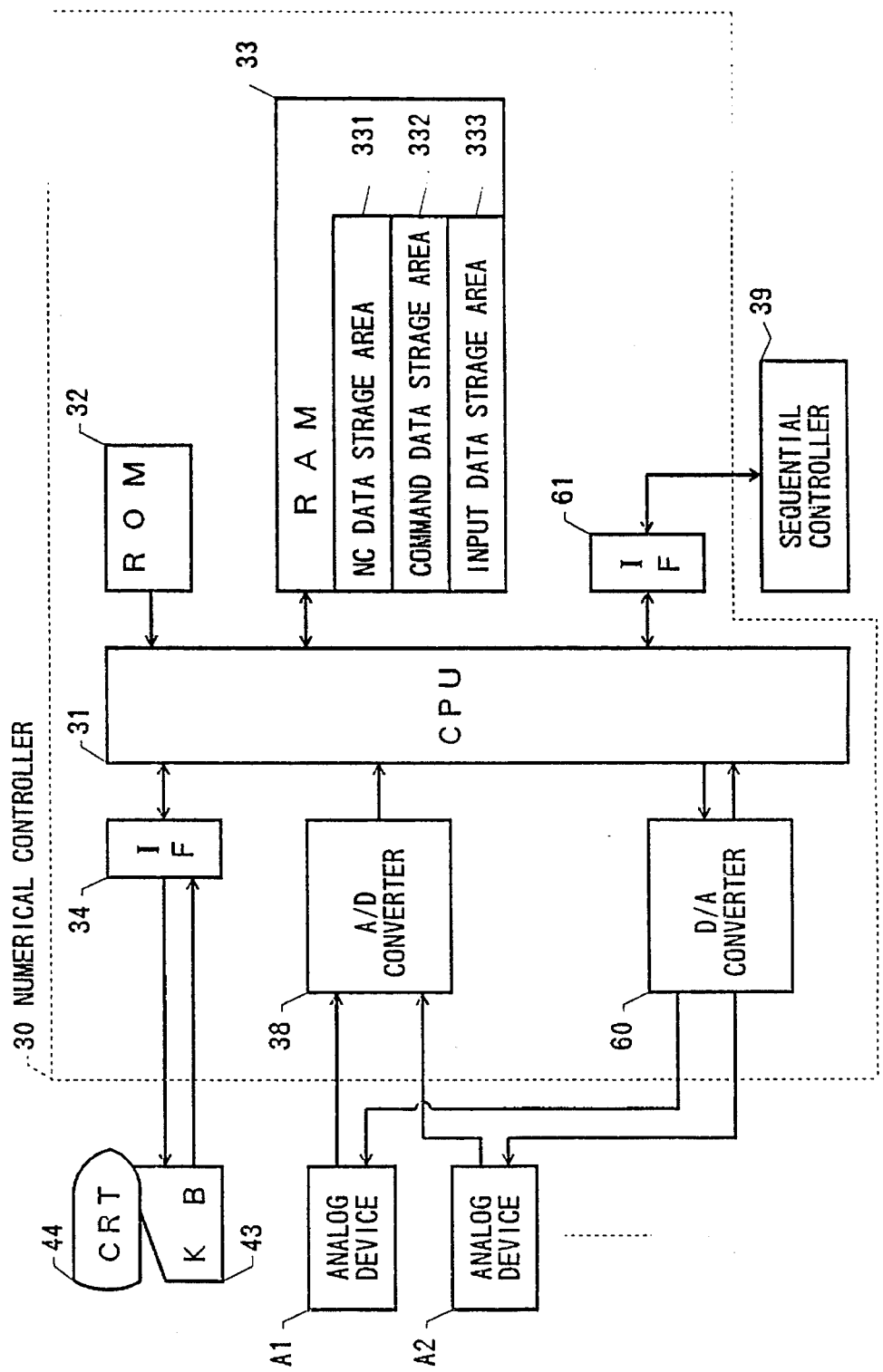
FIG. 11 is a block diagram showing the electrical structure of a numerical controller in a third embodiment according to the present invention.

FIG. 11 is a block diagram showing the electrical structure of the numerical controller 30 in a third embodiment according to the present invention connected to analog devices.

The numerical controller 30 comprises, as principal components, a CPU 31, a ROM 32 storing control programs, RAM 33 for storing data, interfaces 34 and 61, an A/D converter 38, i.e., data input means, and a D/A converter 60, i.e., a data output means.

A keyboard 43 serving as an operator panel provided on a control panel, and a CRT 44 for displaying information are connected through the interface 34 to the CPU 31 of the numerical controller 30.

The A/D converter 38 connected to the CPU 31 converts analog signal provided by analog devices A1, A2, ... into proportional digital data and gives the digital data to the CPU 31.

The D/A converter 60 converts digital data into analog signals. The digital data include command data representing respective reference values in the respective analog devices A1, A2 ....

A sequential controller 39 is connected through the interface 61 to the CPU 31. The sequential controller 39 controls an NC cycle on he basis of the on-off signal with a binary level which is output from CPU 31 corresponding to the levels of the input analog signal from the analog devices and command data set in the RAM 33.

The RAM 33 has an NC data storage area 331 for storing NC data, a command data storage area 332 for storing command data representing plural predetermined reference levels, and an input data storage area 333 for storing input data provided by the analog devices A1, A2 .... The analog device A1 is measuring units 50 shown in FIG. 2.

3. Operations of the Numerical Controller

Figure 12:
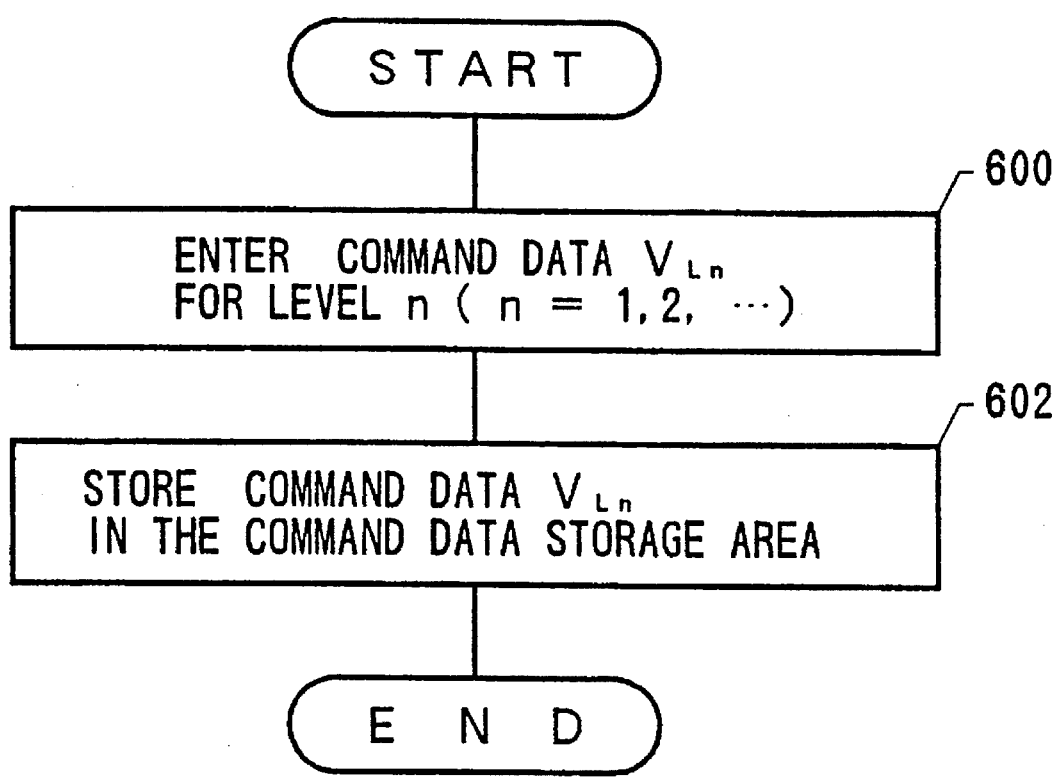
FIGS. 12 and 13 are flow charts of procedures to be executed by a CPU included in the numerical controller of FIG. 11.
Figure 13:
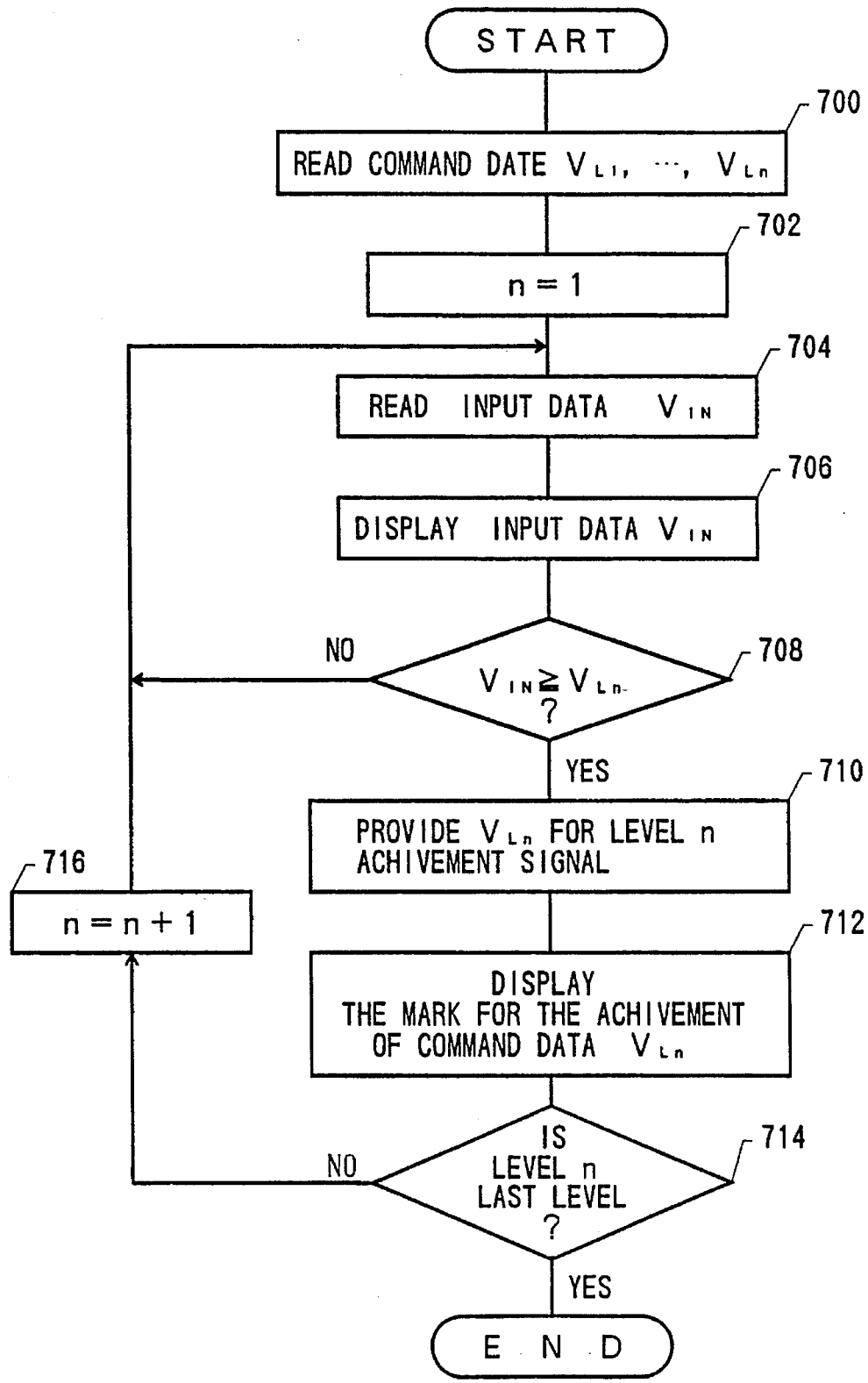

Operations of the numerical controller 30 will be described with reference to FIGS. 12 and 13 showing procedures to be executed by the CPU 31 of the numerical controller 30.

The procedures shown in FIGS. 12 and 13 are executed for each of the analog devices A1, A2 ... and A* connected to the numerical controller 30.

Figures 14A, 14B:
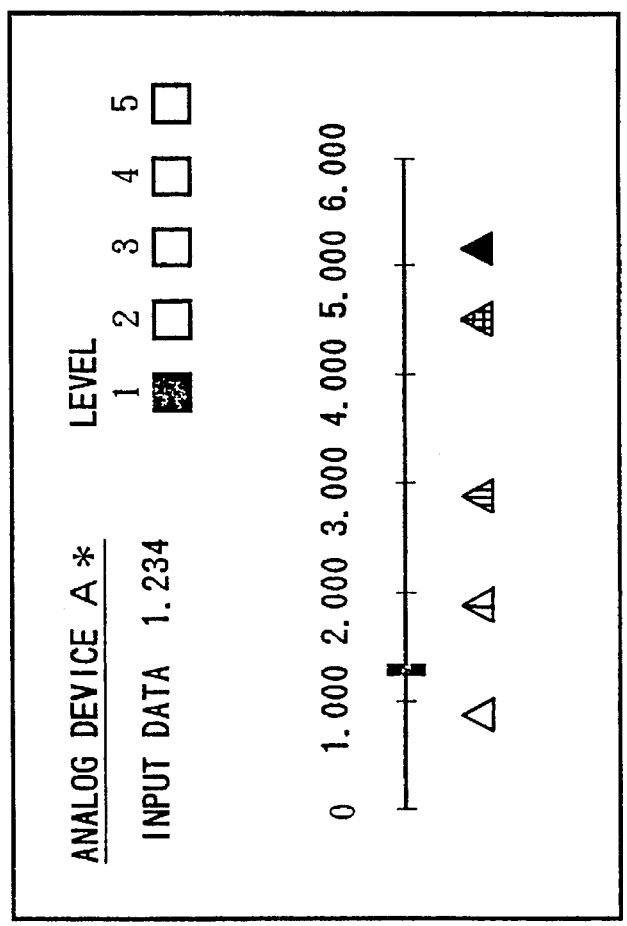
FIG. 14A is a chart showing the relationship between reference levels (points) and a measured value for an analog device A* displayed on the display screen of a CRT connected to the numerical controller of FIG. 11.
FIG. 14B is a view showing marks and concrete command data corresponding to reference levels for setting on the display screen for the analog device A* shown in FIG. 14A.

The operations will be described with the analog device A* by way of example with reference to FIG. 14A showing the display screen of the CRT 44 and FIG. 14B showing command data for setting the reference levels.

First, a reference level setting program shown in FIG. 12 is executed.

In step 600, command data $V_{Ln}$ for setting the reference levels n (n=1, 2 ...) for the analog device A* is entered by operating the keyboard 43.

Since the analog device A1 is the measuring unit 50, the reference levels correspond to the target sizes in the first embodiment.

That is, a reference level 1, for example, is represented by a mark $\Delta$ and a corresponding input command data $V_{L1}=$ 0.885 as shown in FIG. 14B.

Then, in step 602, the command data $V_{Ln}$ is stored in the command data storage area 332 of the 33, and then the program is ended.

Subsequently, an input data display program shown in FIG. 13 is executed. In step 700, command data $V_{L1}, \ldots$ and $V_{Ln}$ corresponding to the reference levels 1, ... and n for the analog devices A*, stored in the command data storage area 332 of the RAM 33 are read.

In step 702, n is set for an initial value 1.

In step 704, input data $V_{IN}$ are read from the analog devices A*.

Figure 15:
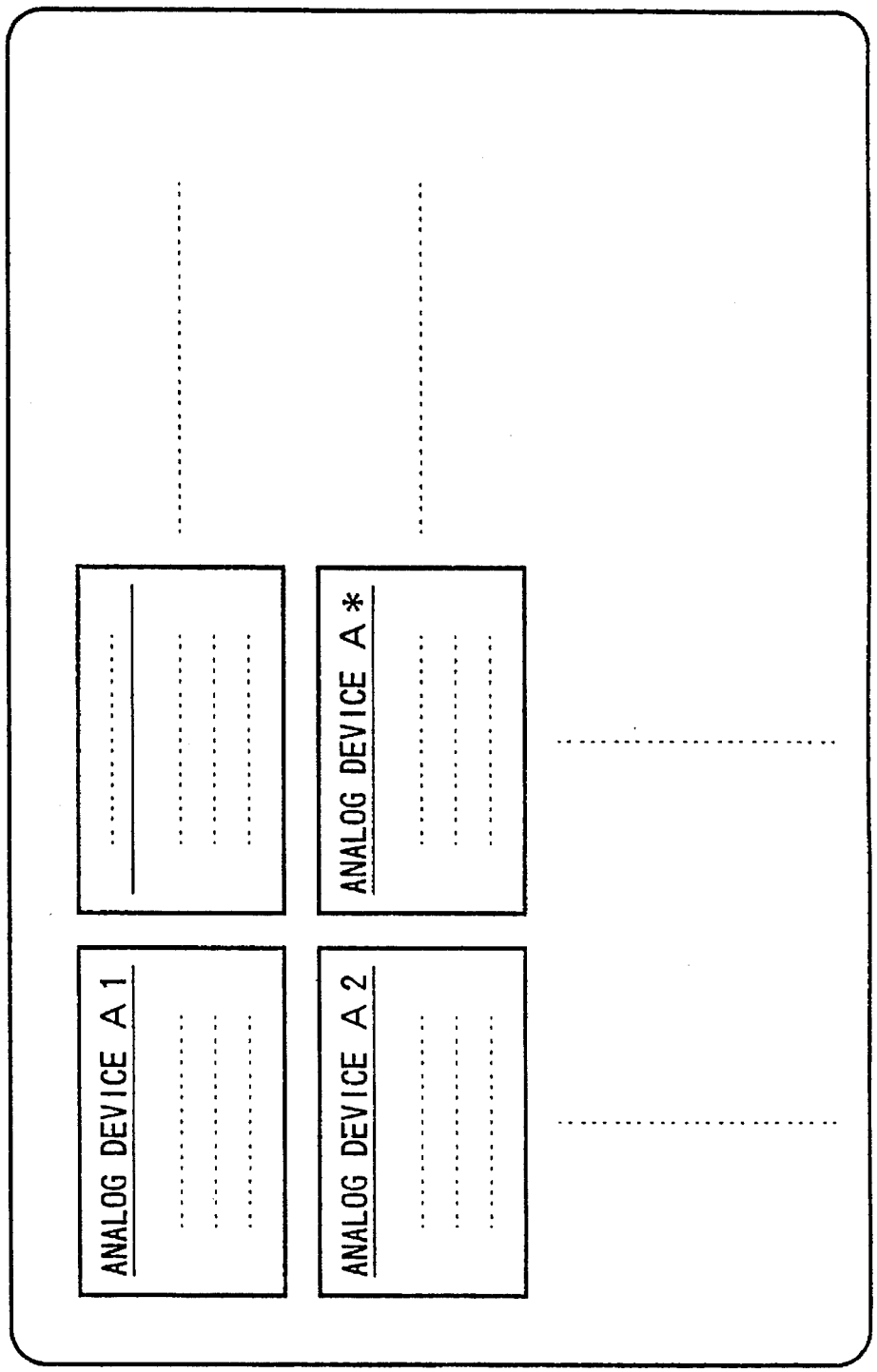
FIG. 15 is a chart for an illustration of the display screen of a CRT connected to the numerical controller of FIG. 11, showing information concerning a measured value and reference level for a plurality of analog devices.

Then in step 706, the input data $V_{IN}$ read in step 704 are displayed at input display positions in individual display areas respectively assigned to the analog devices A* on the display screen of the CRT 44 connected to the numerical controller 30 as shown in FIG. 15.

Then in step 708, it is Judged whether or not the input data $V_{IN}$ read in step 704 is not less than the command data $V_{L1}$ for the reference level 1 of n=1. If the input data $V_{IN}$ is less than the command data $V_{L1}$, the response in step 708 is negative, and the program returns to step 704 to repeat the steps 704 to 708.

If $V_{IN} \geq V_{L1}$, the numerical controller 30 gives an affirmation signal (the sizing signal in case of the analog device A1) indicating that the input data $V_{IN}$ has reached the command data $V_{L1}$ for the reference level 1 to the sequential controller 39 in step 710. Then, the sequential controller 39 commands the numerical controller to start a NC cycle for the reference level 1.

Then, in step 712, an indication indicating $V_{IN}=V_{L1}$ is displayed in step 712.

As shown in FIG. 14A for example, only a blank square

□ for the reference level 1 is changed into a solid square ■ when $V_{L1} \leq V_{IN} < V_{L2}$.

Then, in step 714, it is judged whether or not the reference level 1 is the last reference level. Since command data for the next reference level 2 is provided in this example, the response in step 714 is negative and step 716 is executed.

In step 716, the current reference level is incremented by 1, that is, level 2 is selected, and then the program returns to step 704 to repeat the foregoing procedure.

If the response in step 714 is affirmative, namely, when the current reference level is the last reference level n, the program is ended.

The setting of data including the command data representing the reference levels for the analog devices are entered through the interface 34 in the CPU 31 of the numerical controller 30 by operating the keyboard 43 connected to the numerical controller 30. The CPU 31 can compare the signal level of the input analog signal with the set reference levels to display the existing region of the input analog signal level. And also the CPU 31 can generate the respective on-off signals to change machining modes when the level of the input analog signal becomes equal to the respective reference levels.

Also CPU 31 can transfer the data through the D/A converter 60 to the analog devices.

The numerical controller of the present invention is capable of receiving input data from one of a plurality of analog devices connected thereto and of applying output data produced on the basis of the input data to the rest of the analog devices to control the same.

We claim:

1. A numerical controller capable of changing a control operation of said numerical controller according to a measured dimension of a workpiece, comprising:

reference sizing point storage means for storing data values indicating a reference sizing point which defines a dimension of said workpiece at which said control operation is changed;

reference sizing point reading out means for reading out said data values indicating said reference sizing point;

data input means for receiving a measured analog data value obtained by measuring a dimension of said workpiece and for converting said measured analog data value into a corresponding digital data value;

sizing signal generating means for comparing said digital data provided by said data value input means with said data values indicating said reference sizing point which is read out by said reference sizing point read out means and for generating a sizing signal upon coincidence of said digital data value and said data values indicating said reference sizing point; and control means for changing said control operation of said numerical controller in response to said sizing signal provided by said sizing signal generating means.

2. A numerical controller for controlling a machine tool wherein a control operation thereof is changed according to a dimension of a workpiece which is output from a measuring unit, said numerical controller comprising:

data input means for receiving a measured analog data value obtained from said measuring unit when a masterpiece is measured by said measuring unit and for converting said measured analog data value into a proportional measured digital data value;

sampling interval storage means for storing a sampling interval time;

sampling means for sampling said measured digital data value output by said data input means at a sampling interval determined by said sampling interval time stored in said sampling interval storage means when the masterpiece is measured by said measuring unit;

basic value input means for inputting a basic value indicating an absolute dimension of the masterpiece;

tolerance value input means for inputting a tolerance value which indicates a tolerable value of a deviation from said basic value;

tolerance value storage means for storing the tolerance value input by said tolerance value input means;

calculating means for calculating an upper limit by adding the tolerance value to the basic value and for calculating a lower limit by subtracting the tolerance value from the basic value; and data displaying means for displaying plural measured data values sampled by said sampling means with the basic value, the lower limit and the upper limit.

3. A numerical control let according to claim 2, wherein said sampling means operates within a predetermined sampling time.

4. A numerical controller apparatus, wherein a control operation of the numerical controller is changed according to a measured diameter of a workpiece at a plurality of changeover points during a continuous machining operation, comprising:

means for controlling operation of said numerical controller;

means for measuring said diameter of the workpiece having a pair of contact elements continuously in contact with opposite sides of the workpiece;

means for storing predetermined target data values which represent desired target diameters of the workpiece corresponding to said plurality of changeover points during said continuous machining operation;

means for comparing said measured diameter of the workpiece with a selected one of said predetermined target data values, and outputting a signal to said means for controlling operation of said numerical controller upon coincidence of the measured diameter and said selected one of said predetermined target data values, to thereby control the operation of the numerical controller.

5. The numerical controller apparatus according to claim 4, wherein said means for storing is a RAM device.

6. The numerical controller apparatus according to claim 5, wherein said RAM device has a plurality of storage areas.

7. The numerical controller apparatus according to claim 4, further comprising an analog-to-digital converter for converting the measured diameter from an analog signal to a digital signal, interconnected between said measuring means and said comparing means.

8. The numerical controller apparatus according to claim 4, wherein said measuring means comprises a differential transformer in series connection with an amplifier.

9. The numerical controller apparatus according to claim 4, further comprising a keyboard, a display and an input/output interface for interfacing said keyboard and display with said comparing means.

10. The numerical controller apparatus according to claim 4, further comprising a ROM device which stores control programs used by said comparing means.

11. The numerical controller apparatus according to claim 4, wherein said comparing means is a microprocessor.

12. The numerical controller apparatus according to claim 6, wherein said plurality of storage areas of said RAM device also store numerical control data, masterpiece data, origin data and absolute position data.

13. A numerical controller for controlling a machine tool wherein a control operation thereof is changed according to a dimension of a workpiece which is output from a measuring unit, said numerical controller comprising:

reference sizing point storage means for storing a data value of a reference sizing point indicating a dimension of said workpiece at which said control operation is changed;

reference sizing point read out means for reading out the data value of said reference sizing point;

data input means for receiving an analog data value obtained from said measuring unit when said workpiece is measured by said measuring unit and for converting said analog data value into a corresponding digital data value;

master data storage means for storing a master data value which is input through said data input means when a masterpiece is measured by said measuring unit and which represents an absolute dimension of said masterpiece;

difference value calculating means for calculating a difference value between said master data and the measured absolute dimension of the masterpiece;

compensating means for compensating said digital data value with said calculated difference value;

data evaluating means for evaluating said compensated digital data value with the data value of said reference sizing point which is read out by said reference sizing point read out means;

sizing signal generating means for generating a sizing signal upon coincidence of said compensated digital data value with the data value of said reference sizing signal; and control means for changing said control operation of said numerical controller in response to said sizing signal generated by said sizing signal generating means.

14. A numerical controller according to claim 13, further comprising:

data display means for displaying said digital data value output from data input means and the data value of said reference sizing point for an operator to recognize whether or not the digital data value exceeds the data value of said reference sizing point.

15. A numerical controller according to claim 14, wherein:

said reference sizing point storage means stores plural data values which respectively indicate plural reference sizing points;

said data evaluating means includes means for comparing said digital data value output from said data input means with each of said plural data values respectively indicating the plural reference sizing points; and said data display means is designed to display said digital data value provided by said data input means and said plural data values indicating the plural reference sizing points.

16. A numerical controller according to claim 13, wherein said reference sizing point storage means stores plural data values indicating plural reference sizing points, respectively, and said reference sizing point read out means selectively reads out one of said data values indicating said plural reference sizing points in accordance with a numerical command included in a numerical control program.

17. A numerical controller having a memory means and a central processing unit (CPU) for numerically controlling a machine tool in accordance with numerical control data and in response to a signal from a measuring unit which measures the diameter of a workpiece, wherein:

said memory means stores a data value of a reference sizing point indicating a diameter of said reference sizing point;

said numerical controller further includes data input means for receiving an analog data value obtained from said measuring unit and for converting said analog data value into a corresponding digital data value; and wherein said central processing unit includes reference sizing point reading out means for reading out said data value of said reference sizing point, sizing signal generating means for comparing said digital data value provided by said data input means with said data value indicating said reference sizing point which is read out by said reference sizing point reading out means for generating a sizing signal upon coincidence of said digital data value with said data value indicating said reference sizing point, and control means for changing said control operation of said numerical controller in response to said sizing signal generated by said sizing signal generating means.

* * * * *

UNITED STATES PATENT AND TRADEMARK OFFICE
CERTIFICATE OF CORRECTION

PATENT NO. : 5,477,118
DATED : December 19, 1995
INVENTOR(S) : Takao YONEDA et al.

It is certified that error appears in the above-indentified patent and that said Letters Patent is hereby corrected as shown below:

On the title page, Item [75], the last inventor's name was missing. His name should be included as follows:

--Takayuki HOTTA, Nagoya, Japan--

Signed and Sealed this

Thirtieth Day of September, 1997

Attest:

BRUCE LEHMAN

Attesting Officer

Commissioner of Patents and Trademarks